United States Patent [19]

Macchi

[11] Patent Number: 4,564,934
[45] Date of Patent: Jan. 14, 1986

[54] ADAPTIVE ECHO CANCELLER WITH AGC FOR TRANSMISSION SYSTEMS

[75] Inventor: Odile Macchi, Orsay, France

[73] Assignee: Centre National de la Recherche, Paris, France

[21] Appl. No.: 446,062

[22] Filed: Dec. 1, 1982

[30] Foreign Application Priority Data

Dec. 3, 1981 [FR] France .................. 81 22671

[51] Int. Cl.[4] .................................. H04B 3/20
[52] U.S. Cl. ........................... 370/32; 179/170.2
[58] Field of Search ............... 370/24, 27, 32; 179/170.2, 170.6, 170.8

[56] References Cited

U.S. PATENT DOCUMENTS

| | | | |
|---|---|---|---|
| 3,732,410 | 5/1973 | Mackechnie | 179/170.2 |
| 3,780,233 | 12/1973 | Campanella et al. | 179/170.2 |
| 4,126,770 | 11/1978 | Tamura et al. | 179/170.2 |
| 4,131,767 | 12/1978 | Weinstein | 370/24 |
| 4,268,727 | 5/1981 | Agrawal et al. | 179/170.2 |
| 4,349,889 | 9/1982 | van den Elzen et al. | 375/16 |
| 4,352,962 | 10/1982 | LaMothe | 179/170.2 |
| 4,355,406 | 10/1982 | Guidoux | 179/170.2 |
| 4,360,712 | 11/1982 | Horna | 179/170.2 |

OTHER PUBLICATIONS

D. D. Falconer et al., Adaptive Echo Cancellation-/AGC Structures for Two Wire, Full Duplex Data, Transmission, *The Bell System Technical Journal*, vol. 58, No. 7, Sep. 1979, pp. 1593–1596.

Primary Examiner—Douglas W. Olms
Assistant Examiner—Kenneth I. Rokoff
Attorney, Agent, or Firm—Larson and Taylor

[57] ABSTRACT

An adaptive echo canceller for a full duplex transmission system comprises a cascade arrangement of an adaptive digital filter and an automatic gain control device. The AGC device receives the output signal from the adaptive digital filter and delivers the estimate of the echo signal to the receive line for subtraction. It has a multiplier receiving the output signal and a signal representative of the multiplication factor from a gain adaptation circuit. A separate gain change circuit is connected to receive the output signal from the adaptive digital filter and simultaneously modifies the tap coefficients of said filter and the multiplication factor of the AGC device in opposite directions for maintaining the output of the adaptive digital filter in a predetermined range.

9 Claims, 6 Drawing Figures

ADAPTIVE ECHO CANCELLER WITH AGC FOR TRANSMISSION SYSTEMS

BACKGROUND AND SUMMARY OF THE INVENTION

The invention relates to the field of simultaneous two-way transmission of information on a same communication channel, that is duplex data transmission. It more particularly relates to an echo canceller for such a system, of the type having an adaptive digital filter.

Before the state of the prior art is considered and the invention is summarized, it may be useful to give some indications regarding duplex transmission of data on a common communication channel and to outline the problems which are involved.

Referring to FIG. 1, a system for simultaneous two-way communication between two remote stations A and B on a single communication channel 10, for instance a two-wire telephone circuit, is schematized. The data to be transmitted consist of a sequence of symbols which are typically quantified, which may represent data signals as well as speech signals. When the useful signals a and b from stations A and B are transmitted in the same frequency range, the signal r which is received by receiver 12 at station A includes the useful signal b sent by transmitter 11 of the remote station B, and an additive noise x:

$$r = b + x \tag{1}$$

The noise x may frequently have power much greater than that of the useful signal b. It comprises an echo of signal a transmitted by source 11 at station A, although differential transformers 15 are provided at both ends of the transmission channel 10. That phenomenom is indicated in FIG. 1, where transmission from B toward A is indicated in full line, while transmission from A toward B is indicated in dash-dot lines.

Since the echo signal b may prevent correct recovery of signal b by receiver 12 at station A, its action should be cancelled. There exists a number of approaches for cancellation of the echo. Reference may for instance be had to the following documents for finding examples: Mueller, "A New Digital Echo Canceller for Two-wire Full Duplex Data Transmission", *IEEE Transaction on Communications* 24, No. 9, 1976, pp. 956–962; French Pat. No. 2,377,734; Weinstein, "A Passband Data Driven Echo Canceller For Full Duplex Transmission on Two-wire Circuits", *IEEE Transaction on Communications*, 25, No. 7, 1977, pp. 654–666; Falconer et al "Adaptive Echo Cancellation/AGC Structures for Two-wire Full Duplex Data Transmission", *The Bell System Journal*, Vol. 58 (1979), pp. 1593–1616; U.S. Pat. No. 3,780,233 (Campanella et al).

As a general rule, it has been proposed to locate an echo canceller (which will be referred to in the following by the abreviation ECC) in the receive line. That ECC is an adaptive digital filter 13 whose transfer function may be represented with a vector $\vec{H}$ which, from a sequence A of successive symbols $a_k$ (where k indicates the serial number of the symbol) transmitted by source 11 of station A, delivers a linear estimation:

$$y = \vec{H} \cdot \vec{A} \tag{2}$$

That estimation y may be considered as a reconstruction of the actual echo x. The reconstructed echo is applied to a subtractor 14 which also receives the signal r arriving to station A from the far end on line 10. The difference between the two signals is applied to the receiver 12.

The echo x may generally be considered as comprising a close echo $x_p$ due to the lack of adaptation of the differential transformer 15 of station A and a remote echo $x_L$ due to reflections of the signal a transmitted from A toward B, reflections which are due to lack of impedance adaptation in the communication channel 10:

$$x = x_p + x_L \tag{3}$$

The two echo components have different features. The close echo is much more powerful than the remote echo. And the features of the two echo components and the parameters of the useful signal exhibit large variations depending upon the communication channel which is considered.

It is important to note that the power of echo x is quite variable and its value is unknown. Under actual conditions, the only available indication is the fact that the value is lower than a predetermined maximum level. The power of the useful signal b is also quite variable and the only available indication is the fact that it is higher than a predetermined minimum level. Last, the remote echo $x_L$ is fequently affected with a phase shift, due to phase jitter and a frequency shift in the communication channel, while the close echo is typically not subject to phase shift.

When the ECC consists of an adaptive digital filter of conventional type, it must comprise a large number n of bits on each tap coefficient for the correction to be satisfactory, even if there is no phase shift of the remote echo. Most prior art ECCs typically have twenty bits per tap coefficient, with the consequence that they are complex and of high cost. The need for a large number of bits is particularly due to the broad dynamic range of the echo and the useful signal.

It is an object of this invention to provide an echo canceller for data communication systems which makes it possible to substantially decrease the number n of bits of each coefficient, without detrimentally affecting the performances, particularly the acceptable dynamic range of the echo and useful signal.

When the remote echo exhibits a phase shift, there is another problem which is not overcome in the prior art. As will be more apparent in the following, the ECCs of the prior art cannot operate properly when the echo has a phase shift, unless the power of the echo which is not in phase is known. The performance is detrimentally affected when the power of the echo which exhibits a phase shift increases.

It is another object of the invention to provide an echo canceller which is more effective than the prior art ECCs when an echo exhibiting a phase shift is present.

According to an aspect of the invention, there is provided an echo canceller for a full duplex communication system between two remote stations, comprising an adaptive digital filter and automatic gain control means located downstream of said filter in the communication path, and means for delivering the value of the gain of said automatic gain control means to said filter as an input signal thereof.

In other words, the adaptive digital filter is "looped" on the AGC means, since the gain of the AGC means is fed back to the adaptive filter as an input signal which cooperates in determining the vector of the coefficients of the filter.

Means controlled by the output signal of the adaptive filter will be provided for adjusting the coefficients of the latter for maintaining the power or amplitude level of said output signal in a predetermined range. Such means simultaneously modify the coefficients of the filter and the gain of the AGC means, in opposite directions.

The invention will be better understood from the following description of particular embodiments of the invention and a comparison with the prior art.

SHORT DESCRIPTION OF THE DRAWINGS

Figure 3:
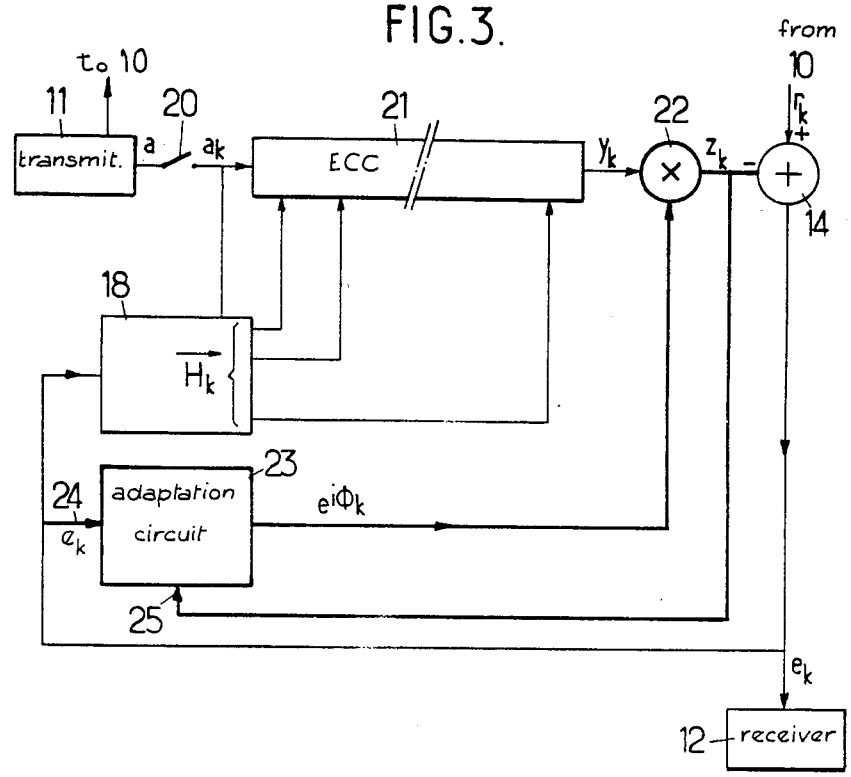
FIG. 3 is an illustration of an ECC of the type illustrated in FIG. 2, further comprising a device for compensating the echo phase shifts.
Figure 4:
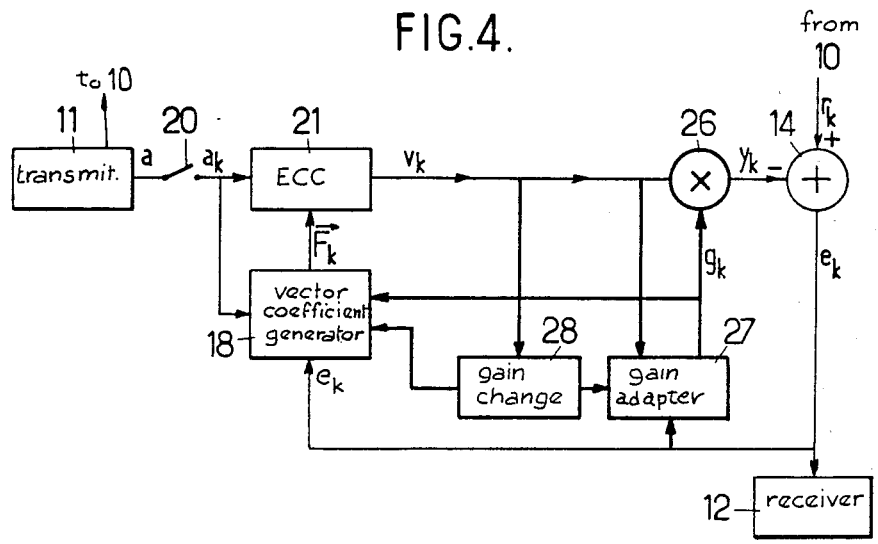
Figure 5:
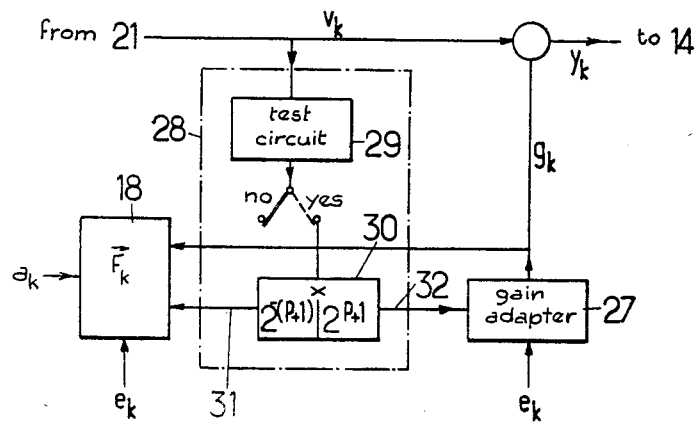
Figure 6:
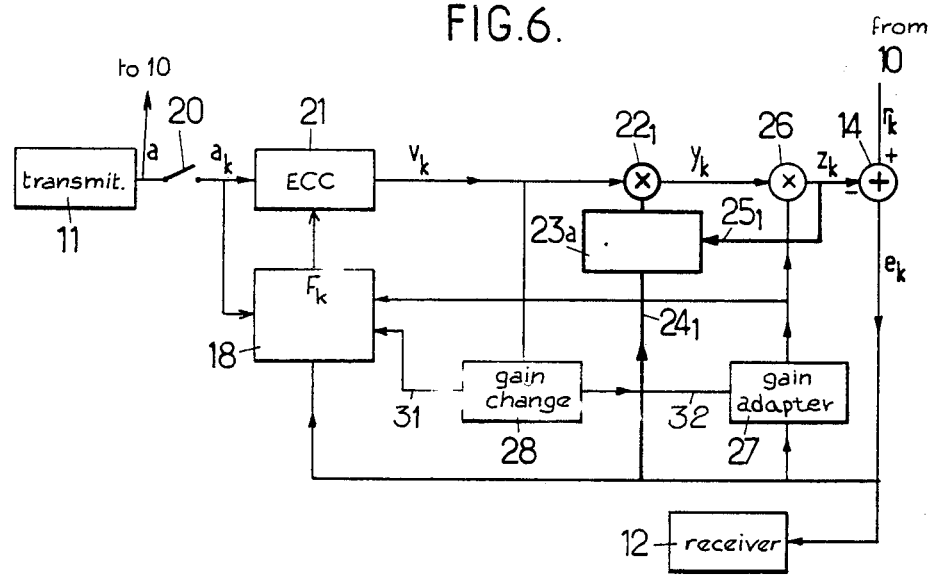

FIG. 4, similar to FIG. 3, is an illustration of the general arrangement of an ECC according to the invention;

FIG. 5 is a block diagram of a possible embodiment of circuit 28 in FIG. 4;

FIG. 6, similar to FIG. 3, is an illustration of an ECC according to the invention further provided with means for compensating any phase shift.

DETAILED DESCRIPTION OF PARTICULAR EMBODIMENTS

Before the invention is described, the structure and operation of an ECC according to the prior art will be described. A more complete description may be found in the documents identified above, whose contents are included in the present specification by way of reference.

Figure 2:
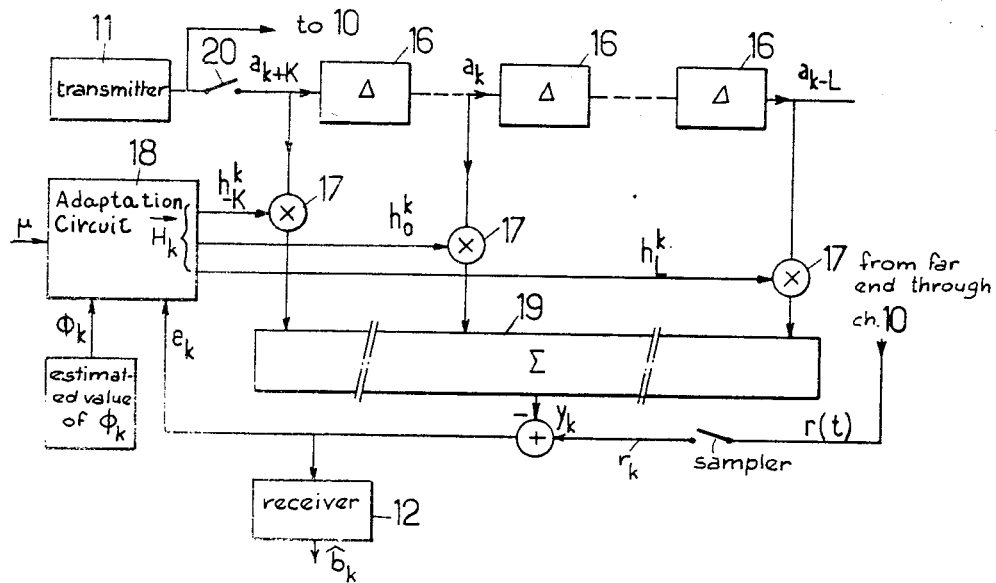
FIG. 2 is a simplified block diagram of an ECC according to the prior art.

Referring to FIG. 2, there are illustrated source 11 and receiver 12 of station A. The signal a sent by transmitter 11 is sampled by a component which is schematically represented as a switch 20, which is closed at intervals $\Delta$. The ECC 13 uses N successive samples to evolve an estimated echo:

$$N = K + L + 1 \tag{4}$$

The successive samples are made simultaneously available by K+L delay elements 16 and their values are:

$$\begin{cases} a_{k+K} = a[(k+K)\Delta], \ldots \\ a_k = a[k\Delta], \ldots \\ a_{k-L} = a[(k-L)\Delta] \end{cases} \tag{5}$$

When signal a is a data signal, $\Delta$ corresponds to the transmission period. When a is an analog signal, the sampling may be made by any known method. However, Shannon sampling will typically be used, for instance with $\Delta \simeq 125 \ \mu S$ for a speech signal.

The N available successive samples are combined for generating vector $\vec{A}_k$ which represents the signal as processed by the digital filter at time $k\Delta$, just after sample $a_k$ has been delivered by transmitter 11. The echo y is reconstructed from such samples by associating a specific coefficient $h_{-k}, \ldots h_0, \ldots, h_L$ to each of them, and then summing the products. The N coefficients are delivered by an adaptation circuit to individual multipliers 17 (or a single time-shared multiplier) and constitute a vector $\vec{H}$ which may change in accordance with an adaptive algorithm of the type:

$$\vec{H}_{k+1} = \vec{H}_k + \mu f(e_k, \vec{A}_k, 100_k) \tag{6}$$

Figure 1:
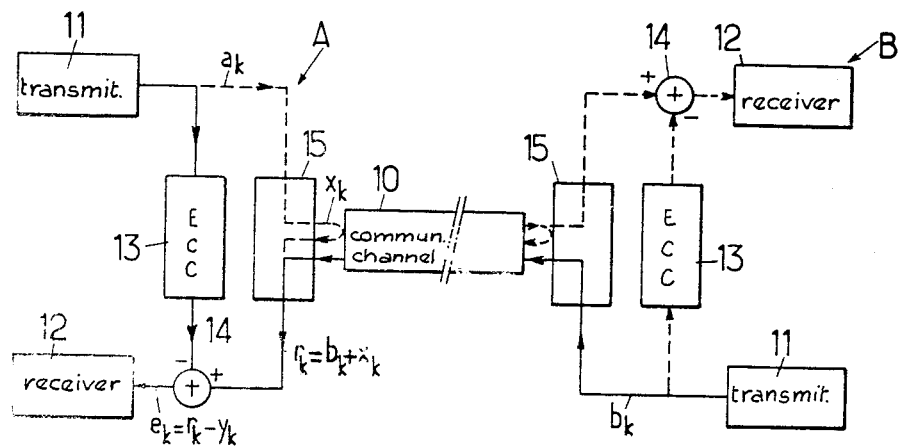
FIG. 1 is a simplified block diagram of a communication system whose end stations are provided with an echo canceller.

In formula (6), $e_k$ is a difference which is representative of the residual echo after compensation. In the approach of FIGS. 1 and 2:

$$e_k = r_k - y_k \tag{7}$$

$e_k$ may be designated as a "clean signal". It consists of the useful signal of transmitter B and the residual echo. It is the difference between signal $r_k$ received at time $k\Delta$ and echo $y_k$ estimated by the ECC at that time:

$$y_k = \vec{H}_k^T \cdot \vec{A}_k \tag{8}$$

Again in formula (6), $\phi_k$ designates an estimation of the phase shift of the echo. $\phi_k$ is to be considered only when the echo has a phase shift. Such a phase shift occurs when the echo is remote. In certain cases, it will not be necessary to take it into account. $\phi_k$ may be delivered by a manually adjustable circuit (FIG. 2).

Last, coefficient $\mu$ of formula (6) is a predetermined positive constant value, which constitutes an incrementation step.

In the prior art situation of an ECC for eliminating the close echoes, which exhibit no phase shift, in a data transmission system, formula (6) may be simplified and becomes the conventional gradient algorithm:

$$\vec{H}_{k+1} = \vec{H}_k + \mu (r_k - y_k) \vec{A}_k \tag{9}$$

The transmitted signal is frequently used for modulation of two carrier waves having a 90° phase difference (QAM). In that case, which is for instance described in French Certificate of Addition 2,394,938, a is a complex signal; $A_k$ and $H_k$ are also complex. The received signal $r_k$ is complex if the receiver 12 has means for obtaining two components with a 90° phase difference (phase splitter in pass-band transmission, demodulation on two carriers with a 90° phase difference if in base band). If the values are complex, the simplified adaptation algorithm (9) may be written:

$$\vec{H}_{k+1} = \vec{H}_k + \mu (r_k - y_k) \vec{A}_k^* \tag{10}$$

In the opposite case (reception system which restitutes only a real component $r_k$) the estimated real echo is:

$$y'_k = \text{Ré}\{\vec{H}_k \vec{A}_k\} \tag{8bis}$$

And the adaptation algorithm may be written:

$$H_{k+1} = H_k + \mu (r_k - y'_k) A_k^* \tag{10bis}$$

In formulae (10) and (10bis), $\vec{A}_k^*$ designates the parameter which is conjugated of $\vec{A}_k$ and in formula (10) Ré designates the real part.

The residual echo which is actually present after compensation by such a conventional ECC may be computed. The power of the residual echo is given by:

$$R = \mu \cdot N \cdot S \cdot E(|a_k|^2)/2 \tag{11}$$

in which S designates the power of the useful signal. Since signal a is typically 1:

$$E(|a_k|^2) = 2 \quad (12)$$

The incrementation step is selected to provide a fixed level of residual noise due to echo for the receiver at station A, that is $$\mu N = \alpha \text{ (constant)} \quad (13)$$

In most cases:

$$\alpha = 2^{-6} \quad (14)$$

for obtaining a signal/noise ratio which has a usual value, of about 18 db, in receiver 12 of station A. Then the incrementation step is:

$$\mu = \alpha/N \quad (15)$$

For an ECC which has about 64 coefficients, that is a number of coefficients which is usual in systems for transmission of data at a rate of 2400 bits/sec., in full duplex, the incrementation step is $\mu = 2^{-12}$.

A calculation indicates that the LSB $2^{-B_{min}}$ of the binary word $h^r$ which represents the real (or imaginary) part of one of the coefficients of the ECC is related to the incrementation step $\mu$ and to the power S of the useful signal by a relation which may be written:

$$\mu\sqrt{2} \sqrt{S} \geq 2^{-B_{min}} \quad (16)$$

if $r_k$ is complex and is:

$$\mu\sqrt{S} \geq 2^{-B_{min}} \quad (16\text{bis})$$

if $r_k$ is real.

The number of bits of the binary word $h_r$ should be such that the MSB $2^{B_{max}}$ can represent the maximum value of the echo, and consequently that number is selected for fulfilling the condition:

$$2^{B_{max}} \geq \sqrt{P_{max}} \quad (17)$$

It is then possible to represent instantaneous echo power values which exceed $4 P^{max}$, when all bits of the word $h_r$ are equal to 1.

Taking into account the sign bit, the total number n of bits representing $h_r$ should be at least:

$$n = \tfrac{1}{2} \log_2(P_{max}/S_{min}) + 1.5 + \log_2(1/\mu) \quad (18)$$

If actual digital values are introduced into formula (18), it is found that the ECC according to the prior art should have from 20 to 22 bits per coefficient, when Pmax=0 dBm and Smin=−42 dBm, that is when Pmax and Smin have typical values.

It is further to be noted that there is a degradation of the theoretical efficiency of such ECCs when the useful signal level decreases.

As indicated above, it is an object of the invention to permit a reduction in the number n of bits representing the coefficients. It is an other object to increase the immunity of the ECC to the phase shift of the echo, which phase shift is particularly important when the remote echo echo is substantial. For making apparent the detrimental action of such an echo on the operation of a conventional ECC, a short description will be given of the approach for compensating the phase shift in such an ECC, with reference to FIG. 3. On FIG. 3, those components which are in addition to those of FIG. 2 for compensating phase shift are indicated with strong lines.

Referring to FIG. 3, the digital filter 21, which includes components 16, 17 and 19 of FIG. 2 and delivers an estimated echo $y_k$ whose amplitude has been reconstructed, is in series relation with a downstream component 22 for providing a phase shift $\exp(i\phi_k)$.

Phase $\phi_k$ is elaborated by a loop controlled by the phase shift between the estimated echo $z_k$ which is delivered by the phase shifter 22 and the received signal $r_k$. Operation of that phase loop may for instance be written as:

$$\phi_{k+1} = \phi_k + \lambda I_m[(r_k - z_k)]z_k^* \quad (19)$$

where:

$$z_k = y_k \exp(i\phi_k) \quad (20)$$

In formula (19), Im is the imaginary part of the complex number.

As a general rule, the loop will consist of a complex multiplier 22 and a circuit 23 for adaptation of $\phi_k$. Circuit 23 has two inputs 24, 25, which respectively receive $e_k$ and $z_k$.

In formula (19), $\phi$ is the positive incrementation step, which must be decreased when the power of the echo increases, since it must fulfil the condition:

$$\lambda = \lambda_0/E(|y_k|^2) = \lambda_0/2P \quad (21)$$

where $\lambda_0$ is a constant value which is conditioned by the gain of the loop.

That calculation indicates that the incrementation step cannot be defined unless the echo power P is known. As a consequence, an ECC having means for correcting the phase of a substantial echo cannot operate correctly unless the power P of the echo is known. In most situations, the condition is not fulfilled and the efficiency of the ECCs according to the prior art is detrimentally affected when the power of the component of the echo which has a phase shift increases.

A first important difference between the invention and the prior art consists in that filter 21 having a single vector H defined by coefficients h is substituted with:
- an "upstream" standardized vector $\vec{F}$ which is such that application of vector F to signal a regulates the amplitude at a value which is approximately fixed, for instance equal to 1,
- and a "downstream" single multiplication factor g which is variable and positive and may be considered as being an AGC gain.

F and g should be adaptive.

An approximative amplitude regulation may be sufficient, with a tolerable variation range which may be in a ratio of from 1 to 2. That possibility is most important, since it results in a possible reduction of the number of bits representing each coefficient of $\vec{F}$.

In other words, the signal is subjected to two successive processing steps, the upstream processing step being symbolized by vector $\vec{F}$ and being looped on the downstream processing step g.

Referring to FIG. 4, a preferred (but not exclusive) embodiment of the invention will now be described. For more clarity, those components of FIG. 4 which are in addition to those necessary in FIG. 2 are indicated in strong lines. The common components are designated by the same reference numerals.

The circuit component which introduces vector $\vec{F}$ consists of a conventional echo canceller 21 (which may include the delay elements 16, multipliers 17 and summation circuit 19 of FIG. 2) associated with a circuit 18 which delivers a vector $\vec{F_k}$ corresponding to each sample $a_k$. Circuit 18 will be defined in more detail in the following. Suffices it to note for the time that circuit 18 is controlled for the output signal $a_k$ of ECC 21 to have a power level which is approximately fixed, for instance approximately equal to 1.

A "downstream" AGC circuit is located between the ECC 21 and the adder 14. That AGC circuit comprises a multiplier 26 which receives the output signal $v_k$ from the "upstream" component (ECC 21) and which delivers an output signal $y_k$ to adder 14. The multiplication factor $g_k$ for a sample $v_k$ is determined by a gain adapting circuit 27. The adder 14 again delivers the clean signal $e_k$. With the above notation, the signals satisfy the relations:

$$e_k = r_k - y_k \tag{22}$$

$$v_k = \vec{F_k} \cdot \vec{A_k} \tag{23}$$

$$y_k = g_k \cdot v_k \tag{24}$$

Formulae (22) and (23) are respectively similar to formulae (7) and (8) of a conventional ECC.

However, control of the adaptive circuit 18 will now be effected non only responsive to the useful signal $e_k$ (as in prior art systems), but also responsive to:

the loop feed back signal $g_k$ delivered by circuit 27,
a signal for approximative amplitude regulation delivered by a circuit 28 which has a symetrical action on the adaptive circuit 18 and the gain adapting circuit 27.

As an example, it will be assumed that the approximative amplitude regulation is for standardizing the real part $v_k^1$ (and/or the imaginary part $v_k^2$) of $v_k$ according to the condition:

$$0.5 \leq \text{Ampl}\ (v_k^1) < 1.$$

Such a regulation may be effected quite simply. In the embodiment schematically illustrated in FIG. 5, circuit 28 has a test device 29 which determines the first significant bit $2^p$ of $|v_k^1|$ which is not equal to zero. That circuit does not make the determination on the instantaneous value, but on an average value of $v^1$ taking into account adjacent time periods having a predetermined duration. The test device 29 consequently determines the integer p which corresponds to the first significant bit of v for each value $v_k$, that is the value of p which fulfils the condition:

$$2^p \leq E(|v_k^1|) < 2^{p+1} \tag{25}$$

The amplitude regulation, with an approximation which corresponds to a multiplication factor of 2, may be made by a circuit 30 for adjustment of the coefficients of $\vec{F_k}$ and of gain $g_k$ by applying multiplication factors to them. Since the circuits use binary digits, a multiplication is carried out by sending a bit shift order symetrically on two outputs 31 and 32. For instance, a multiplication by a factor of $2^{-(p+1)}$ is necessary for power regulation, the bit shift orders delivered on outputs 31 and 32 would be such that:

$$\vec{F_k}^1 = \vec{F_k} \cdot 2^{-(p+1)} \tag{26}$$

$$g_k^1 = g_k \cdot 2^{p+1} \tag{27}$$

It is readily apparent that the estimated echo $y_k$ is unchanged, while echo $v_k$ is regulated for approximatively keeping an amplitude value equal to 1.

A similar approach could be used for controlling the average power $E(|v_k|^2)$. However, regulation is then with an approximation on two bits, that is of the type:

$$\tfrac{1}{4} \leq P(v_k') < 1 \tag{28}$$

While operation could be represented by a single algorithm (Formula 10) in a conventional ECC, the apparatus of the invention is controlled by two algorithms, which respectively correspond to the ECC 21 and to the multiplier 26:

$$\vec{F_{k+1}} = \vec{F_k} + (\beta/g_k) e_k \vec{A_k^*} \tag{29}$$

$$g_{k+1} = g_k + \nu \text{Ré}\{e_k v_k^*\} \tag{30}$$

In the formulae $\beta$ and $\nu$ are two incrementation steps having positive predetermined values.

Algorithm (29) is the same as algorithm (10) corresponding to a conventional ECC, except that the incrementation step $\beta/g_k$ incorporates the value of the gain downstream of the ECC.

In a first embodiment, circuit 18 is designed to take into account the effective gain $g_k$ for each sample. However, since that approach requires a considerable amount of computing time due to the number of divisions which are involved, it may be preferable to consider the first significant bit of $g_k$ which is different from zero. For that determination, the average value is computed on predetermined periods overlapping the sample numbered k. That determination of the average value may be made in the same way as that of $v_k^1$.

According to that approach, there is determined the integer n which is such that:

$$2^m \leq E(g_k) < 2^{m+1} \tag{31}$$

And algorithm (29) may be written:

$$\vec{F_{k+1}} = \vec{F_k} + (\beta/2^m) e_k \vec{A_k^*} \tag{29bis}$$

That simplified approach results in a considerable gain in the computation time, since the division by $g_k$ consists of a shift by one or more binary positions. It will be shown that the simplification has no substantial influence on the performance of the device.

Gain $g_k$ as determined represents the amplitude value of the echo. As a consequence, the power P in formula (28) is:

$$2^m \simeq \sqrt{P} \tag{32}$$

Before a quite important advantage of the invention, namely the reduction in the number of bits necessary for each coefficient is emphasized, it may be useful to mention an apparent shortcoming, which however has no true importance, particularly since there is a complete freedom to adopt a compromise between a maximum adaptation speed and the suppression of any echo additional to that of a conventional ECC.

Due to the cascade arrangement of two components, the power R' of the residual echo is not as given by formula (11), but the sum of two components:

$$R' = R_F + R_g \qquad (33)$$

$R_F$ designates the contribution of the ECC 21. In the situation of a unitary signal corresponding to formula (12), $R_F$ can be written as:

$$R_F = \beta NS \qquad (34)$$

The contribution $R_g$ is always positive. It is due to the adaptative AGC. The degradation due to the separation of a conventional ECC into two components may be expressed as:

$$\delta = R_g/R_F$$

$\delta$ may be computed easily and it appears that it is a function of $\nu/\beta$:

$$\delta = 1/2N \cdot \nu/\beta \qquad (35)$$

It is essential to keep in mind that such a degradation does not automatically reflect performances lower than that of the single ECC of FIGS. 1 and 2, but only the effect of the cascade arrangement of two adaptive components.

Degradation $\delta$ is an increasing function of $\nu/\beta$. It will always be possible to maintain it at a low value, for instance:

$$\delta \leq 0.25 \qquad (36)$$

(that degradation corresponds to a loss of 1 dB only on the attenuation of the echo).

From that selection, the condition to be fulfilled for a negligible degradation may be written:

$$(\nu/\beta)_{opt} \leq N/2 \qquad (37)$$

For an ECC having 55 coefficients:

$$(\nu/\beta)_{opt} \leq 27 \qquad (38)$$

The power R' of the residual echo reflects the behaviour of the device in static condition. It is however essential to consider the dynamic behaviour, for which a maximum value of $\nu/\beta$ is quite preferable, since it corresponds to a maximum speed of convergence of the device. A comparison between the dynamic behaviour of a conventional ECC as shown in FIGS. 1 and 2 and the behaviour of a device according to the invention indicates that the two devices have the same convergence speed if:

$$\nu/\beta = 2N/(N=2) << 27 \qquad (39)$$

As soon as $\nu/\beta$ has a value which is higher than that given by formula (39), the device according to the invention has an adaptation speed which is increased as compared with that of the prior art devices, at the cost of a small amount of increase of the residual echo, of about 1 dB.

On the other hand, if the primary objective is to avoid any supplemental residual echo as compared with a prior art ECC (i.e. if the two residual echoes as given by formulae (33) and (11) should be equal), it is sufficient to select an appropriate value of $\beta$. If for instance $N=55$:

$$\beta = 4/5\mu \qquad (40)$$

In short, it will be appreciated that the invention always provides a reduction in the number of bits necessary for representing each coefficient and in addition makes it possible to reach an increased adaptation speed.

That possibility appears from a line of reasoning similar to that which resulted into formula (17). That line of reasoning indicates that the first significant bit of the word $f^r$ representing the real (or imaginary) part of one of the coefficients of the ECC fulfils the condition:

$$2^{BF_{max}} > (\text{maximum power of } v_k^1) \qquad (41)$$

Since that power is regulated and has a value which is close to 1, formula (41) may be written:

$$B_{max}^F = 0 \qquad (42)$$

The first or least significant bit is related to the incrementation step $\beta/2^m$, which appears in formula (29), by a formula similar to formula (16). A line of reasoning similar to that already given for a conventional ECC indicates that the total number $n'$ of bits of $f^r$ is:

$$n' = \tfrac{1}{2} \log_2(P/S)_{max} + 1.5 + \log_2(1/\beta) \qquad (43)$$

If formulae (43) and (18) are compared, it is found that the difference $n-n'$ between the number of bits of a conventional ECC and the number of bits in a device according to the invention is:

$$n - n' = \tfrac{1}{2} \log \beta/\mu + \tfrac{1}{2} \log (P_{max}/S_{min}) = \tfrac{1}{2} \log (P/S)_{max} \qquad (44)$$

Referring to the above examples, where $P_{max}=0$ dBm, $S_{min}=-42$ dBm and $(P/S)_{max}=16$ dB, with $\beta/\mu=0.794$, the difference is 4 bits: the device as a whole is considerably less complex.

That advantage remains if an echo phase shift should be compensated and a further advantage consists in improved immunity. The device may then be as shown in FIG. 6, where the components already shown in FIG. 4 have been designated by the same reference number. Compensation of the phase shift $\phi_k$ takes place after amplitude regulation and before automatic gain control. In the embodiment of FIG. 6, that compensation is achieved by locating a multiplier $22_1$ between components 21 and 26, so that the multiplier receives the reconstructed echo $v_k$. The multiplication factor of the complex multiplier which constitutes the phase shift circuit is determined by a phase adaptation circuit $23_1$ with two inputs. A first input $24_1$ receives the clean signal $e_k$ and the other input $25_1$ receives the output signal of multiplier 26.

In such an arrangement, the incrementation step $\lambda$ of the phase correction loop is independent from the echo power P, since signal $v_k$ received by the multiplier $22_1$ is regulated and its power variations are in a range of from 1 to 4 (for the complex signal).

As a consequence, the efficiency of the ECC is not detrimentally affected when there is an increase of the power of that echo which exhibits a phase shift and this is a definite advantage on the prior art ECCs.

There is no need to describe the internal arrangement of the various components of the device. They consist of digital logic circuits having a construction which is conventional in datacommunication. The elements which are in addition to those present in conventional ECCs have a construction which is much simpler thn that of the prior art ECCs. The main difference between the adaptation circuit 18 of FIGS. 4 and 6 and that of a conventional ECC resides in the provision of a supplemental circuit for up and down shifting of the bits of all coefficients by one position, depending upon the signals received from circuit 28, for achieving modifications in a ratio of 2/1 and ½.

In short, the ECC according to the invention, which combines a conventional adaptive filter with an AGC device, retains the advantageous properties of the prior art devices as regards datacommunication. The elaborated computing device consisting of the adaptive filter directly handles the binary signals consisting of the local data. However, the echo canceller according to the invention has a less number of bits per coefficient than the prior art ECCs and it is much less sensitive to echoes exhibiting a phase shift.

Those skilled in the art will appreciate that numerous embodiments and numerous variations are possible. The invention may be used in a system operating in passband as well as in the base band system which was more particularly considered above, with the usual modifications to be made in the reception system.

I claim:

1. Echo canceller for cancelling an echo of an echo path in a full duplex communication system between two remote stations, said echo canceller comprising:
   an adaptive digital filter, located at one of said stations, for receiving data sent from one of said stations to the echo path, said adaptive digital filter including a plurality of variable tap coefficients and being arranged to deliver a filtered signal representative of a said echo of said echo path;
   automatic gain control means for receiving said filtered signal and for generating an estimated value of said echo;
   subtraction means for receiving said estimated echo value and a signal from the other one of said stations through said echo path and for subtracting said estimated echo value from a composite signal includng said signal from the other one of said stations and noise due to said echo path;
   and means for delivering the value of the gain of said automatic gain control means to said filter as an input signal thereto.

2. Echo canceller according to claim 1, comprising gain change means responsive to said filtered signal of said adaptive digital filter for adjusting the tap coefficients of said adaptive digital filter for maintaining the level of said filtered signal in a predetermined range having upper and lower levels by modifying all of said tap coefficients when said level exceeds either level of said predetermined range.

3. Echo canceller according to claim 2, wherein said gain change means are arranged for simultaneously multiplying the tap coefficients of said filter and the gain of the automatic gain control means by ratios which are in mutually inverse relationship.

4. Echo canceller according to claim 3, wherein said gain change means are arranged for modifying the tap coefficients of said filter and the gain by ratios equal to ½ and 2.

5. Echo canceller according to claim 1, wherein said automatic gain control means include a multiplier connected to receive the output signal of said adaptive digital filter and a circuit for adapting said gain according to an iteration algorithm which is a function of a clean signal consisting of the difference between the actual received signal and the output signal of the automatic gain control means and is a function of the output signal of said adaptive digital filter.

6. Echo canceller according to claim 5, wherein said adaptive digital filter and said automatic gain control means are arranged for the vector $\vec{F}$ of the tap coefficients of said filter and the gain g to be adapted by the iteration algorithm to fulfil the following condition:

$$\vec{F}_{k+1} = \vec{F}_k + (\beta/g_k)e_k\vec{A}_k^*$$

$$g_{k+1} = g_k + \nu\text{Ré}\{e_k v_k^*\}$$

wherein $\vec{A}_k^*$ designates a vector which is conjugated from the vector of a sequence of successive data symbols $a_k$ which are sent,
$e_k$ designates the clean signal,
$\beta$ and $\nu$ are predetermined positive incrementation steps,
Ré is the real part of $\{e_k V_k^*\}$.

7. Echo canceller according to claim 6, wherein $g_k$ is replaced in $F_k$ only with that power m of 2 which fulfils the condition:

$$2^m \leq E(g_k) < 2^{m+1}.$$

8. Echo canceller according to claim 1, further comprising a circuit for echo phase correction located in series relation between said adaptive digital filter and said automatic gain control means.

9. An echo canceller having adaptive filter means for providing an estimate of an echo signal on a receive line for subtraction from an incoming actual signal on said receive line, said adaptive filter means comprising:
   an adaptive digital filter arranged to receive a signal on a send line and to generate an output signal,
   automatic gain control means connected to receive the output signal from said adaptative digital filter and to deliver said estimate to said receive line for subtraction, and including multiplier means receiving said output signal,
   and gain adaptation means connected to receive the output signal from said adaptative signal filter and arranged for simultaneously modifying tap coefficients of said filter and a multiplication factor of said multiplier means in opposite ratios.

* * * * *